(12) United States Patent
Ryu

(10) Patent No.: US 9,537,136 B2
(45) Date of Patent: Jan. 3, 2017

(54) BATTERY PACK

(71) Applicant: Jae-Uk Ryu, Yongin (KR)

(72) Inventor: Jae-Uk Ryu, Yongin (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 613 days.

(21) Appl. No.: 13/833,973

(22) Filed: Mar. 15, 2013

(65) Prior Publication Data

US 2014/0030558 A1   Jan. 30, 2014

(30) Foreign Application Priority Data

Jul. 25, 2012 (KR) .................... 10-2012-0081264

(51) Int. Cl.
*H01M 2/34* (2006.01)
*H01M 2/30* (2006.01)
*H01M 10/42* (2006.01)

(52) U.S. Cl.
CPC ............... *H01M 2/34* (2013.01); *H01M 2/30* (2013.01); *H01M 10/425* (2013.01)

(58) Field of Classification Search
None
See application file for complete search history.

(56) References Cited

U.S. PATENT DOCUMENTS

| | | | |
|---|---|---|---|
| 4,729,162 A * | 3/1988 | Him et al. | 29/623.3 |
| 7,824,798 B2 * | 11/2010 | Bang | 429/178 |
| 2003/0121142 A1 | 7/2003 | Kikuchi et al. | |
| 2011/0123836 A1 * | 5/2011 | Jang | 429/7 |
| 2011/0268996 A1 * | 11/2011 | Lee | 429/7 |
| 2011/0308856 A1 * | 12/2011 | Park | 174/84 R |
| 2012/0052332 A1 * | 3/2012 | Ahn | 429/7 |

FOREIGN PATENT DOCUMENTS

| | | |
|---|---|---|
| JP | 2002-141051 A | 5/2002 |
| JP | 2003-323930 A | 11/2003 |
| KR | 10-2011-0139083 A | 12/2011 |

* cited by examiner

*Primary Examiner* — Maria J Laios
(74) *Attorney, Agent, or Firm* — Lee & Morse, P.C.

(57) ABSTRACT

A battery pack includes a lead tab, a connection member positioned on a protective circuit module, the connection member connecting the protective circuit module and the lead tab and having a first through-hole, and a soldering member inserted into the connection member through the first through-hole so as to form a connection between the connection member and the lead tab.

12 Claims, 7 Drawing Sheets

BATTERY PACK

CROSS-REFERENCE TO RELATED APPLICATION

This application claims priority under 35 U.S.C. §119 to Korean Patent Application No. 10-2012-0081264, filed on Jul. 25, 2012, in the Korean Intellectual Property Office, the entire contents of which are incorporated herein by reference.

BACKGROUND

1. Field

Embodiments relate to a battery pack.

2. Description of the Related Art

Recently, battery packs have been variously used as power sources of potable electronic devices. As the portable electronic devices are used in various fields, the demand for battery packs has rapidly increased. The battery packs can be charged/discharged a plurality of times, and accordingly are economically and environmentally efficient. Thus, the use of the battery packs is encouraged.

SUMMARY

Embodiments are directed to a battery pack including a lead tab, a connection member positioned on a protective circuit module, the connection member connecting the protective circuit module and the lead tab and having a first through-hole; and a soldering member inserted into the connection member through the first through-hole so as to form a connection between the connection member and the lead tab. The lead tab may extend from a bare cell.

The connection member may include a space portion between the connection member and the protective circuit module. The lead tab may be inserted into the space portion.

The soldering member may fill the space portion.

A region of the protective circuit module where the lead tab is inserted may include a step.

The connection member may include a flat plate portion opposite to the protective circuit module, and first support portions respectively extending from lateral sides of the connection member adjacent a side of the connection member into which the lead tab is inserted, the first support portions supporting the flat plate portion with respect to the protective circuit module.

The connection member may further include a second support portion extending from a side of the connection member opposite to the side of the connection member into which the lead tab is inserted, the second connection member further supporting the flat plate portion with respect to the protective circuit module.

The connection member may further include a guide portion extending from the side of the connection member into which the lead tab is inserted.

The lead tab may include a second through-hole, the second through-hole being located at a position corresponding to a location of the first through-hole.

The soldering member may fill the second through-hole.

The second through-hole may include a plurality of second through-holes.

The lead tab may include a prominence.

The lead tab may include a first region and a second region, the second region being positioned closer to the connection member than the first region, and the second region being narrower than the first region.

The lead tab may include a bent portion.

The lead tab may include a protruding portion.

The lead tab and the connection member may be coupled by a hook structure.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
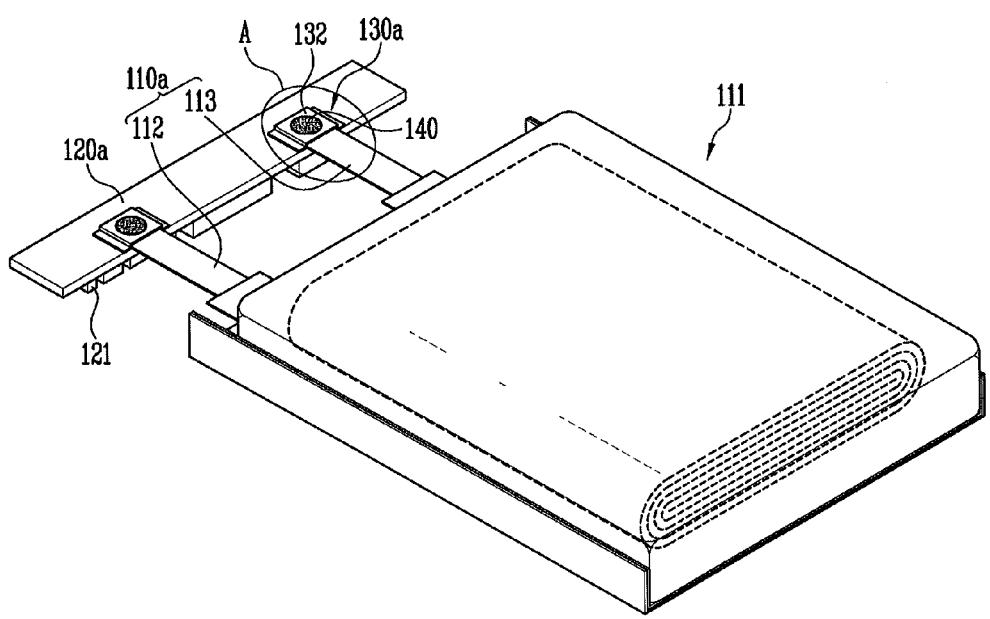
FIG. 1 illustrates a perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
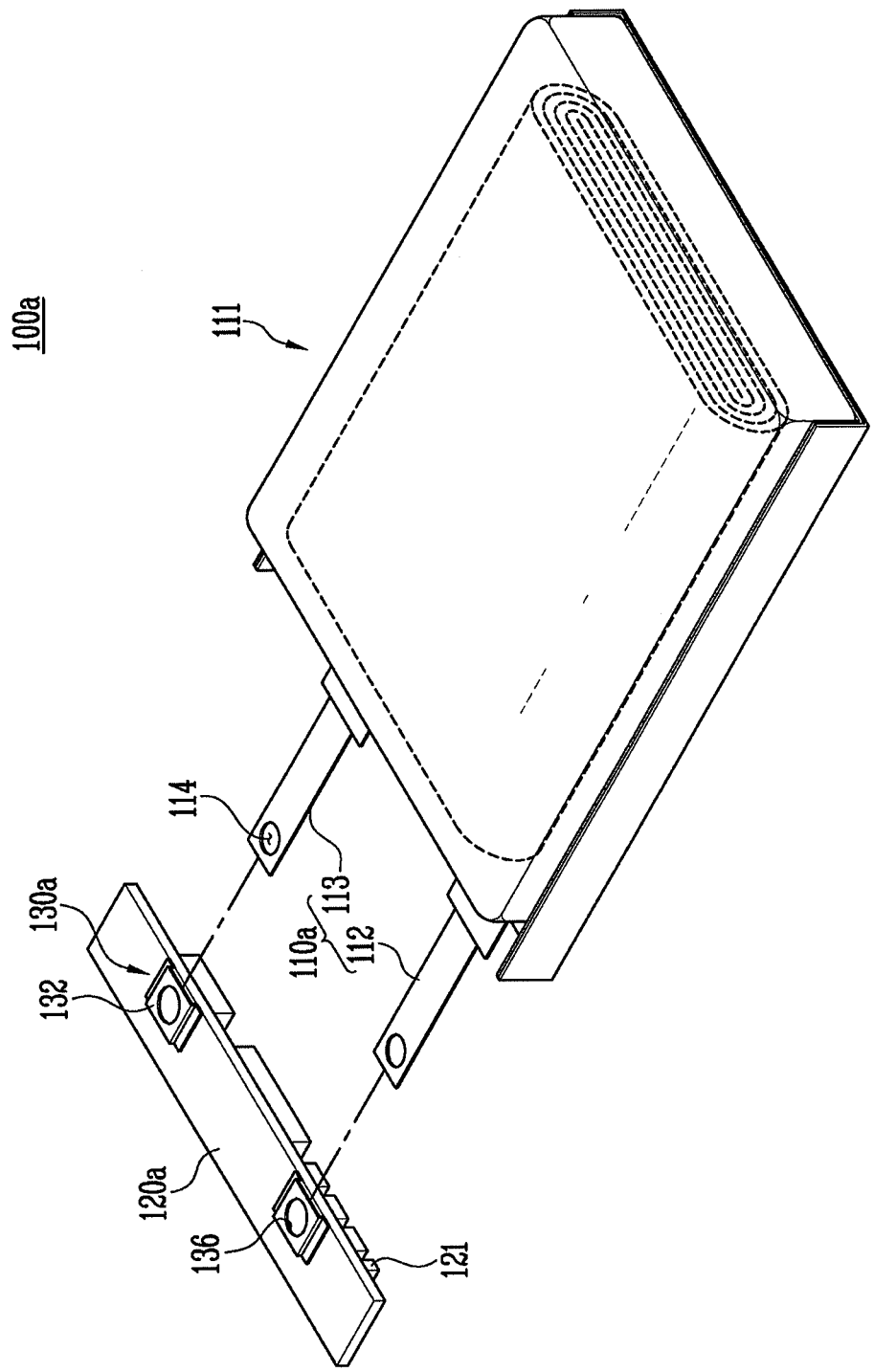
FIG. 2 illustrates an exploded perspective view of the battery pack shown in FIG. 1.

FIG. 1 illustrates a perspective view of a battery pack 100$a$ according to an embodiment. FIG. 2 illustrates an exploded perspective view of the battery pack shown 100$a$ in FIG. 1. Hereinafter, the battery pack 100$a$ according to this embodiment will be described above with reference to FIGS. 1 and 2.

As shown in FIGS. 1 and 2, the battery pack 100$a$ according to this embodiment may include a lead tab 110$a$, a protective circuit module 120$a$, a connection member 130$a$ that is positioned on the protective circuit module 120$a$ so as to connect the protective circuit module 120$a$ and the lead tab 110$a$, the connection member 130$a$ having a first through-hole 136 formed therein, and a soldering member 140 inserted into the connection member 130a through the first through-hole 136 so as to form a connection between the connection member 130a and the lead tab 110a. The soldering member 140 may be inserted into the connection member 130a through the first through-hole 136. Thus, the soldering member 140 may form a firm connection between the connection member 130a and the lead tab 110a.

The lead tab 110a is a member for electrically connecting components of the battery pack 100a to the protective circuit module 120a. The lead tab 110a may extend, for example, from a bare cell 111, an electrode assembly or an assembly of a plurality of bare cells. For convenience of illustration, it is described in this embodiment that the lead tab 110a extends from the bare cell 111.

The lead tab 110a electrically connects the protective circuit module 120a to the bare cell 111 or the like. Accordingly, the lead tab 110a may be made of an electrically conductive metal such as gold, silver, copper or nickel. The lead tab 110a may include a first lead tab 112 connected from a first electrode plate of the bare cell 111 and a second lead tab 113 connected from a second electrode plate of the bare cell 111. The first and second lead tabs 112 and 113 may have positive and negative polarities, respectively. A second through-hole 114 may be formed in the lead tab 110a, as will be described in detail below.

The bare cell 111 is a member that generates electrochemical energy through the movement of ions and electrons. The bare cell 111 may include an electrode assembly therein. Although it has been described in FIGS. 1 and 2 that the bare cell 111 is a pouch-type bare cell, in other implementations, the bare cell 111 may also be another type of bare cell, such as a prismatic-type bare cell.

The protective circuit module 120a is a member that controls voltage or current in the charging and discharging of the bare cell 111.

The protective circuit module 120a may include a circuit board having a circuit pattern formed therein. A plurality of electronic components 121 may be mounted on one surface of the protective circuit module 120a. The electronic components 121 may include a field effect transistor (FET), an integrated circuit (IC), a positive temperature coefficient (PTC), or the like. The electronic components 121 may perform a function of controlling the electrode assembly in the bare cell 111 or cutting off the circuit in an abnormal operation of the electrode assembly. The circuit board of the protective circuit module 120a may include a switching circuit so as to more efficiently control or protect the battery pack 100a, together with the electronic components 121. The protective circuit module 120a may prevent the explosion, overheating, and leakage of the battery pack 100a, and the deterioration of charging/discharging characteristics, by blocking overcharging, overdischarging, over current, short circuit, and reverse voltage of the battery pack 100a. Further, the protective circuit module 120a may remove risk factors and extend the lifetime of the battery pack 100a by preventing the degradation of electrical performance and abnormal operation.

Although it has been illustrated in this embodiment that the protective circuit module 120a and the bare cell 111 are connected in the state that they are spaced apart from each other, this is merely an exemplary embodiment. In other implementations, the protective circuit module 120a may be positioned adjacent to the bare cell by being rotated together with the lead tab 110a. The lead tab 110a may be bent, and the protective circuit module 120a may be mounted on a sealing portion of the bare cell 111.

Figure 3:
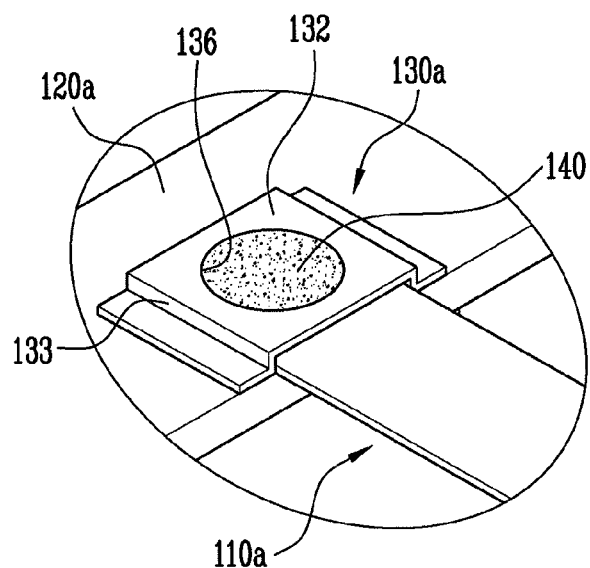
FIG. 3 illustrates an enlarged view of portion 'A' shown in FIG. 1.
Figure 4:
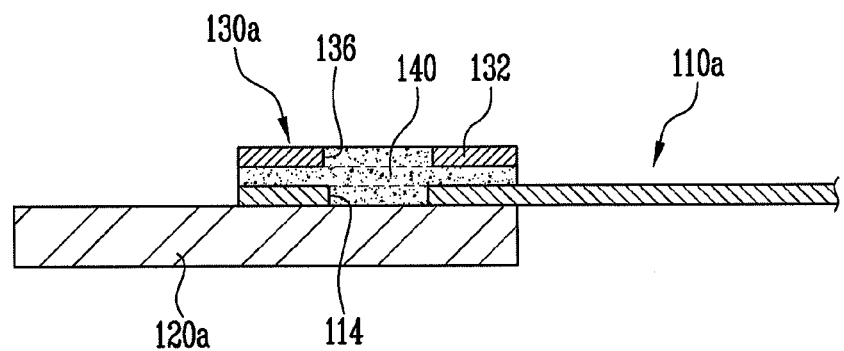
FIG. 4 illustrates a sectional view of a connection structure between a lead tab and a connection member, shown in FIG. 1.

FIG. 3 illustrates an enlarged view of portion 'A' shown in FIG. 1. FIG. 4 illustrates a sectional view of a connection structure between the lead tab 110a and the connection member 130a, shown in FIG. 1. Hereinafter, the connection member 130a and the soldering member 140 according to this embodiment will be described with reference to FIG. 3.

The connection member 130a is a member that is positioned on the protective circuit module 120a and that connects the protective circuit module 120a and the lead tab 110a to each other. The connection member 130a may have a space portion provided therein.

The connection member 130a may include, for example, a flat plate portion opposite to the protective circuit module 120a, and first support portions 133 respectively extending from opposing sides of the flat plate portion 132 so as to support the flat plate portion 132 with respect to the protective circuit module 120a. A space portion may be provided between the flat plate portion 132 and the protective circuit module 120a, and the lead tab 110a may be inserted into the space portion. The lead tab 110a may be inserted into the space portion so that the protective circuit module 120a and the lead tab 110a are connected to each other. The connection member 130a may be connected to the circuit pattern of the protective circuit module 120a so as to perform a function of electrically and physically connecting the lead tab 110a and the protective circuit module 120a to each other or to perform a function of simply placing the lead tab 110a to correspond to the circuit pattern of the protective circuit module 120a.

The first through-hole 136 may be formed in the flat plate portion 132 of the connection member 130a. The first through-hole 136 may be formed at a position corresponding to that of the second through-hole 114 formed in the lead tab 110a. For example, the first and second through-holes 136 and 114 may be positioned so that the centers of the first and second through-holes 136 and 114 correspond to each other.

The lead tab 110a may be inserted into the space portion provided by the connection member 130a. Accordingly, the protective circuit module 120a and the lead tab 110a may be positioned so that wide surfaces of the protective circuit module 120a and the lead tab 110a face the same direction. Thus, the entire thickness of the connection structure between the lead tab 110a and the protective circuit module 110a may be decreased. Accordingly, it may be possible to decrease the thickness of the battery pack 100a and to prevent an assembling failure of the battery pack 100a in advance. The lead tab 110 may not pass through the protective circuit module 120a, and accordingly, it may be possible to prevent a height of a lead peak from being increased.

The soldering member 140 is a member that connects and firmly fixes the connection member 130a and the lead tab 110a to each other. The soldering member 140 may be inserted into connection member 130a through the first through-hole 136.

The soldering member 140 may be inserted into the connection member 130a through the first through-hole 136 of the connection member 130a so as to be positioned in the space portion between the connection member 130a and the protective circuit module 120a and inside the first through-hole 136. Thus, a firm fixation between the connection member 130a and the lead tab 110a may be obtained, and accordingly, the connection member 130a and the lead tab 110a may be electrically connected through the soldering member 140. It will be apparent that the connection member 130a and the lead tab 110a may be electrically connected while coming into direct contact with each other. The first support portion 133 may perform a function of preventing the soldering member 140 from moving to the outside of the connection member 130a. Accordingly, the external appearance of the battery pack may be kept neat and tidy.

The soldering member 140 may be, for example, a material that can be easily melted by a soldering iron and can be easily solidified again. The soldering member 140 may be a wire solder, ball solder, cream solder, or the like.

Figure 5:
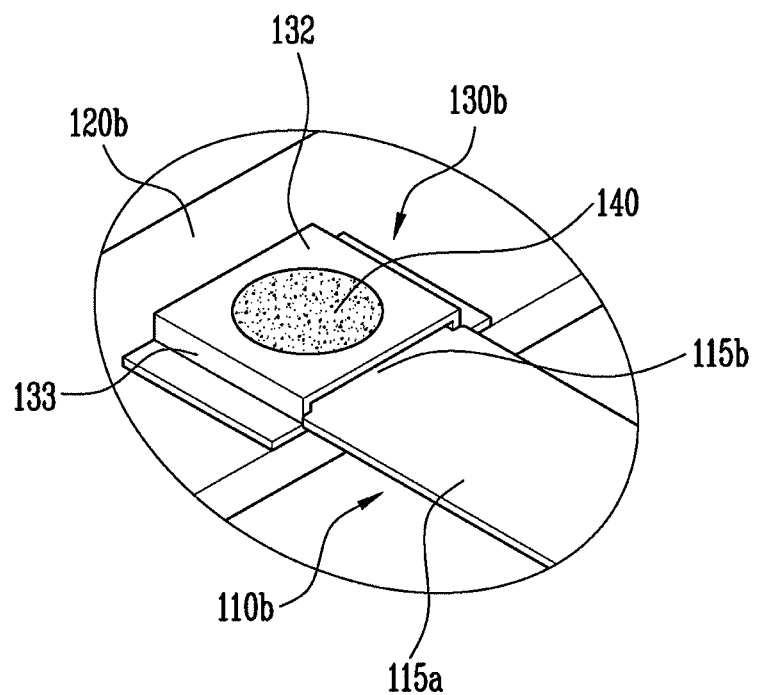
FIG. 5 illustrates a perspective view of a connection structure between a lead tab and a connection member according to another embodiment.
Figure 6:
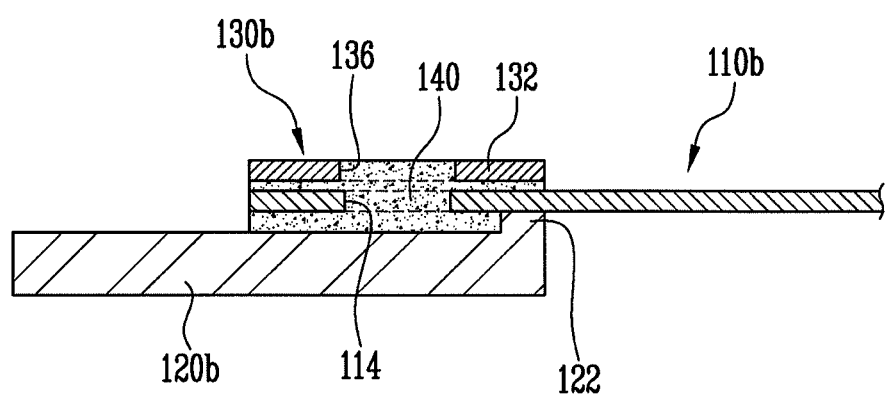
FIG. 6 illustrates a sectional view of the connection structure shown in FIG. 5.

FIG. 5 illustrates a perspective view of a connection structure between a lead tab 110b and a connection member 130b according to another embodiment. FIG. 6 illustrates a sectional view of the connection structure shown in FIG. 5. Hereinafter, the connection structure between the lead tab 110b and the connection member 130b according to this embodiment will be described with reference to FIGS. 5 and 6.

As shown in FIGS. 5 and 6, the lead tab 110b of the battery pack according to this embodiment is divided into a first region 115a and a second region 115b, and a step 122 may be formed in a protective circuit module 120b.

The lead tab 110b may include the first region 115a and the second region 115b, the second region 115b being positioned closer in the direction of the connection member 130b than the first region 115a. In this case, the width of the second region 115b may be narrower than the first region 115a. The width of the space between the two support portions 133 of the connection member 130b may be wider than or identical to that of the second region 115b, and may be narrower than that of the first region 115a. When the lead tab 110b is inserted into the space portion of the connection member 130b, the second region 115b having a narrow width may be inserted into the space portion, and the first region 115a having a wide width may be latched to the first support portion 133. The width of the lead tab 110b may be selectively provided such that a corner of the first region 115a may be used as a stopper. The lead tab 110b may be exactly placed in the space portion of the connection member 130b. Accordingly, the first and second through-holes 136 and 114 may be positioned to correspond to each other. A worker may be able to place the lead tab 110b exactly without any separate measurement, thereby providing convenience of processing.

The step 122 may be formed in one region of the protective circuit module 120b. The step 122 may be formed at an insertion region of the lead tab 110b in the region of the protective circuit module 120b. Accordingly, the lead tab 110b may be inserted between the step 122 and the flat plate portion 132 of the connection member 130b. Thus, the internal space portion of the connection member 130b may be sealed to some degree by the step 122 of the protective circuit module 120b. Accordingly, it may be possible to prevent the soldering member, which may have mobility before being solidified, from moving to the outside through the side surface into which the lead tab 110b is inserted from the space portion of the connection member 130b. In this case, the soldering member 140 may not be moved to the outside through the space portion of the connection member 130b. Accordingly, it may be possible to maintain the external appearance of the battery pack to be neat and tidy and to allow the soldering member 140 not to be short-circuited with a conductor such as another circuit pattern.

Figure 7:
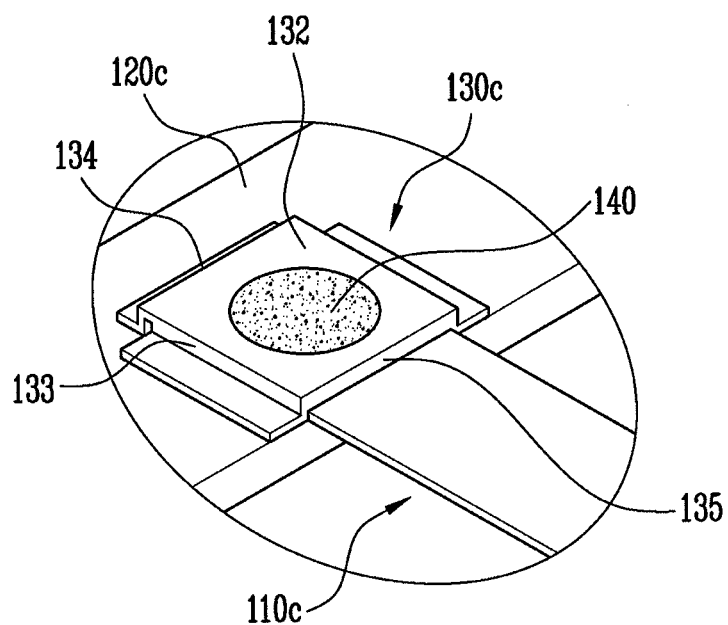
FIG. 7 illustrates a perspective view of a connection structure between a lead tab and a connection member according to still another embodiment.
Figure 8:
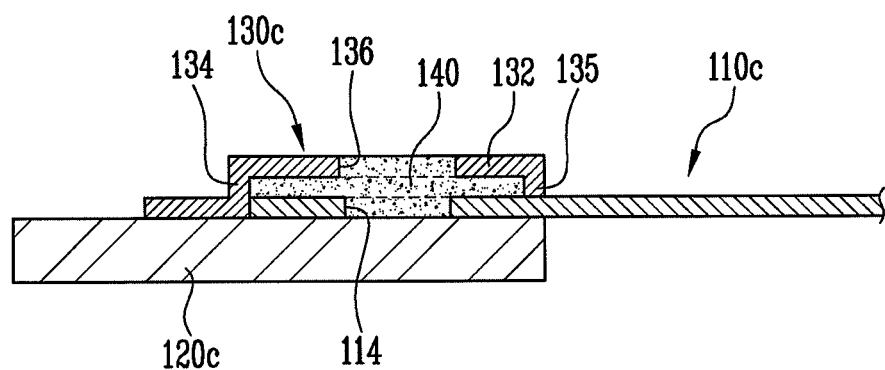
FIG. 8 illustrates a sectional view of the connection structure shown in FIG. 7.

FIG. 7 illustrates a perspective view of a connection structure between a lead tab 110c and a connection member 130c according to still another embodiment. FIG. 8 illustrates a sectional view of the connection structure shown in FIG. 7. Hereinafter, the connection structure between the lead tab 110c and the connection member 130c according to this embodiment will be described with reference to FIGS. 7 and 8.

As shown in FIGS. 7 and 8, the connection member 130c of the battery pack according to this embodiment may further include not only a flat plate portion 132 and a first support portion 133, but also a second support portion 134 and a guide portion 135.

The second support portion 134 may extend from a side surface opposite to the side into which the lead tab 110c is inserted among the side surfaces of the flat plate portion 132, so as to support, together with the first support portion 133, the flat plate portion 132 with respect to the protective circuit module 120c. Therefore, the second support portion 134 may extend from the flat plate portion 132 to the protective circuit module 120c. Accordingly, the second support portion 134 may perform not only a function of supporting the flat plate portion 132 but also a function of a stopper. When the lead tab 110c is inserted into a space portion of the connection member 130c, the front end of the lead tab 110c may be inserted into the space portion of the connection portion 130c until the front end of the lead tab 110c comes in contact with the second support portion 134 (see FIG. 8). When the front end of the lead tab 110c comes in contact with the second support portion 134, the exact position of the lead tab 110c may be set. When the front end of the lead tab 110c comes in contact with the second support portion 134, the first and second through-holes 136 and 114 may be positioned opposite to each other.

The guide portion 135 may extend from the side surface into which the lead tab 110c is inserted among the side surfaces of the flat plate portion 132. Unlike the first and second support portions 133 and 134, the guide portion 135 may not extend to the protective circuit module 120c. The front end of the guide portion 135 and the protective circuit module 120c may be spaced apart from each other, and the lead tab 110c may be inserted into the space portion of the connection member 130c through the separated space. In this case, the guide portion 135 may guide the insertion of the connection member 130c and prevent the soldering member 140 from moving out to the side surface of the connection member 130c. Thus, the external appearance of the battery pack may be kept neat and tidy, and it may possible to prevent an undesired short circuit from occurring due to the movement of the soldering member 140.

Figure 9A:
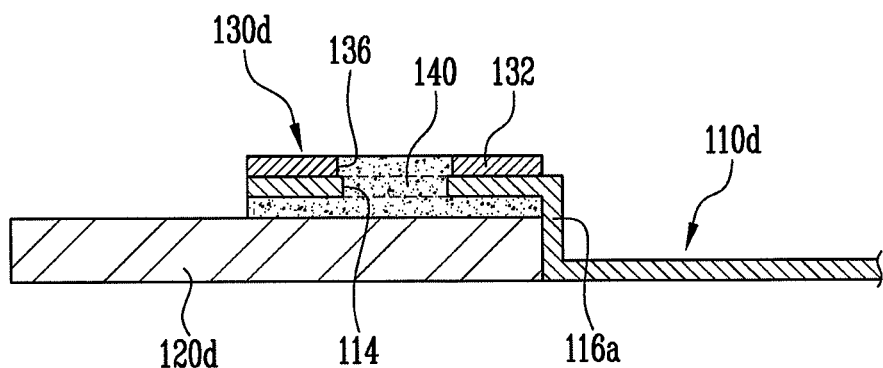
FIGS. 9A to 9C illustrate sectional views of respective connection structures between lead tabs and connection members according to still other embodiments.
Figure 9B:
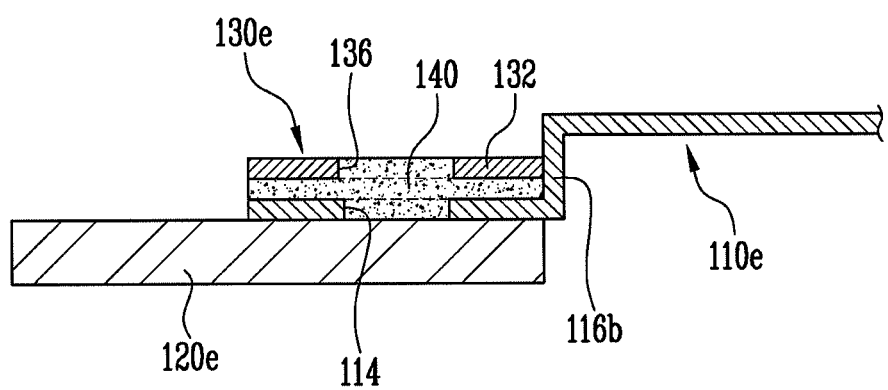
Figure 9C:
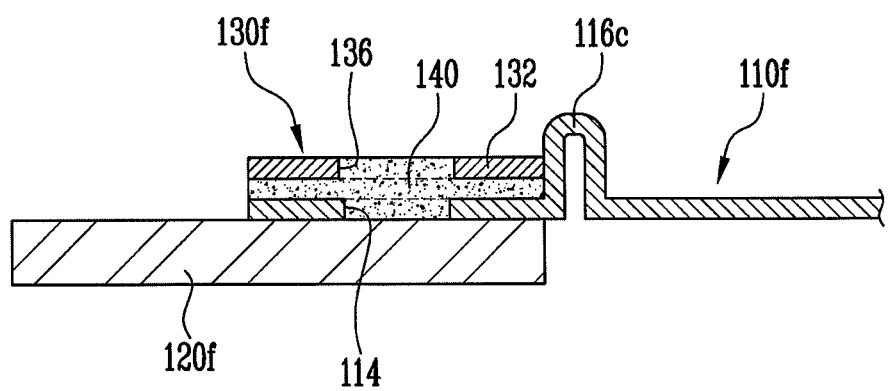

FIGS. 9A to 9C illustrate sectional views of respective connection structures between lead tabs 110d, 110e and 110f and connection members 130d, 130e and 130f according to still other embodiments. Hereinafter, the connection structures between the lead tabs 110d, 110e and 110f and the connection members 130d, 130e and 130f according to these embodiments will be described with reference to FIGS. 9A to 9C.

As shown in FIGS. 9A to 9C, bending portions 116a, 116b and 116c may be formed at the respective lead tabs 110d, 110e and 110f of the battery pack according to these embodiment. Specifically, as shown in FIG. 9A, a bending portion 116a that is bent twice may be formed at the lead tab 110d so that the lead tab 110d is divided into a first region having a relatively high height and a second region having a relatively low height. The first region of the lead tab 110d may be inserted into the space portion of the connection member 130d. The soldering member 140 filling the space portion may be blocked by the bending portion 116a so as not to move to the outside of the connection member 130d. Accordingly, it may be possible to maintain the external appearance of the battery pack to be neat and tidy and to provide a stable electrical connection.

As shown in FIG. 9B, the lead tab 110e may be divided into a first region having a relatively low height and a second region having a relatively high height, based on the bending portion 116b. The soldering member 140 filling the space portion of the connection member 130e may be blocked by the bending portion 116b so as not to move to the outside of the connection member 130e when the first region is inserted into the space portion. In this case, the height of the second region may be formed to be higher than that of the flat plate portion 132, so that the second region may be used as a stopper of the lead tab 110e.

As shown in FIG. 9C, a plurality or bending portions 116c or a bending portion 116c bent to be rounded may be formed at the lead tab 110f. Accordingly, the soldering member 140 may be prevented from moving to the outside by the bending portion 116c. The top surface of the bending portion 116c may be formed to be higher than the flat plate portion 132. Thus, the bending portion 116c may be used as a stopper of the lead tab 110f.

Figure 10:
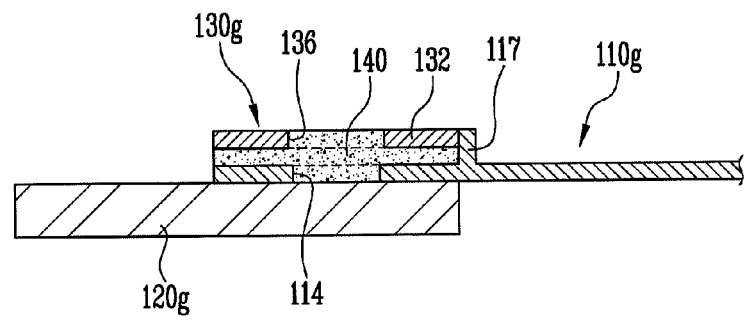
FIG. 10 illustrates a sectional view of a connection structure between a lead tab and a connection member according to still another embodiment.

FIG. 10 illustrates a sectional view of a connection structure between a lead tab 110g and a connection member 130g according to still another embodiment. Hereinafter, the connection structure between the lead tab 110g and the connection member 130g according to this embodiment will be described with reference to FIG. 10.

As shown in FIG. 10, a protruding portion 117 may be provided to the lead tab 110g according to this embodiment. Thus, if the lead tab 110g is inserted into the space portion of the connection member 130g, the soldering member 140 filling the space portion cannot move to the outside of the connection member 130g. The height of the protruding portion 117 may be formed to be higher than that of the flat plate portion 132, so that the protruding portion 117 may be used as a stopper of the lead tab 110g.

Figure 11:
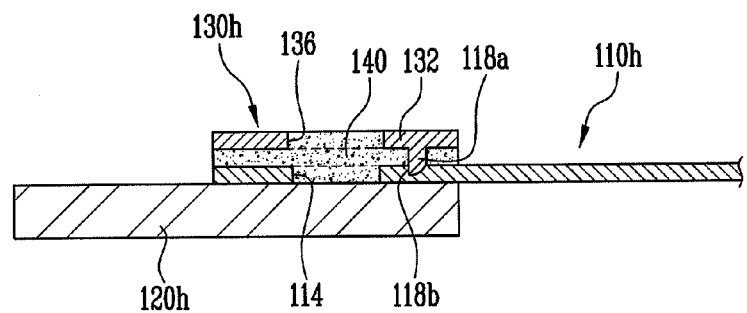
FIG. 11 illustrates a sectional view of a connection structure between a lead tab and a connection member according to still another embodiment.

FIG. 11 illustrates a sectional view of a connection structure between a lead tab 110h and a connection member 130h according to still another embodiment. Hereinafter, the connection structure between the lead tab 110h and the connection member 130h according to this embodiment will be described with reference to FIG. 11.

The lead tab 110h may not be fixed to the connection member 130h before the soldering member 140 is formed. Therefore, before the soldering member 140 is formed, the lead tab 110h could be shaken, or the position of the lead tab 110h could be changed. In order to prevent such a problem, the connection member 130h and the lead tab 110h may be coupled by a hook structure as shown in FIG. 11. For example, a hook 118a having a sloped surface may be formed at one side of the connection member 130h, and a groove 118b may be formed in the lead tab 110h, so that the connection member 130h and the lead tab 110h may be hook-coupled to each other. In other implementations, the groove 118b may be formed in the connection member 130h, and the hook 118a may be formed at the lead tab 110h.

Although it has been illustrated in FIG. 11 that the flat plate portion 132 of the connection member 130h and the lead tab 110h are hook-coupled to each other, other configurations are possible. For example, the lead tab 110h and the first support portion 133, second support portion 134 or guide portion 135 of the connection member 130h may be hook-coupled to each other.

Figure 12:
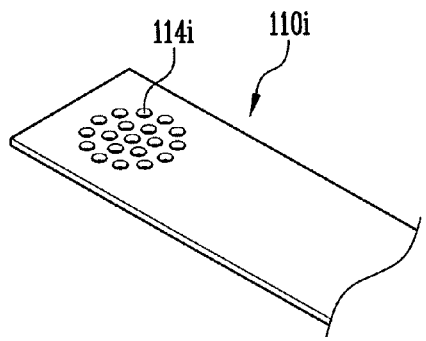
FIGS. 12 and 13 illustrate perspective views of respective lead tabs 110$i$ and 110$j$ according to still other embodiments.
Figure 13:
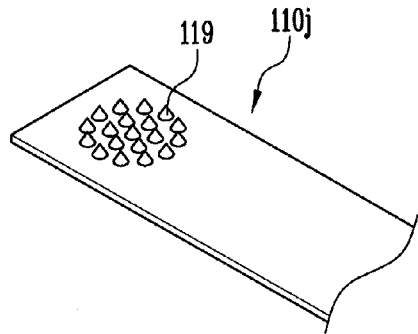

FIGS. 12 and 13 illustrate perspective views of respective lead tabs 110i and 110j according to still other embodiments. Hereinafter, the lead tabs 110i and 110j according to these embodiments will be described with reference to FIGS. 12 and 13.

Specifically, as shown in FIG. 12, a plurality of second through-holes may be formed in the lead tab 110i. The soldering member 140 inserted through the first through-hole 136 may fill the space portion of the connection member connection member 130i through the plurality of second through-holes 114i.

As shown in FIG. 13, prominences 119 may be formed on the lead tab 110j. The prominences 119 may perform a function of improving the coupling between the soldering member 140 and the lead tab 110j by increasing the coupling area between the soldering member 140 and the lead tab 110j. The prominences 119 may be implemented in various shapes such as lattice, pyramid, cone, and saw tooth shapes.

By way of summation and review, as the size and weight of electronic devices decreases, battery packs having a small size and light weight become desirable. However, when a material such as lithium having high reactivity is provided to the inside of the battery pack, a reduction in the size and weight of the battery pack is limited due to the safety concerns. Accordingly, a variety of studies have been conducted to develop a battery pack that may provide a small and light battery pack while improving the safety of the battery pack.

Embodiments may provide a battery pack that is small in size and light in weight using a new structure. Embodiments may also provide a battery pack having improved safety. In a battery pack according to embodiments, a soldering member is inserted into the first through-hole formed in a connection member, so that a firm coupling between the connection member and a lead tab may be provided, thereby improving the safety of the battery pack. Further, a space portion may be provided between the connection member and a protective circuit module, and the lead tab may be inserted into the space portion, so that the thickness of the battery pack may be decreased, thereby implementing the miniaturization of the battery pack.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A battery pack, comprising:
   a lead tab;
   a connection member positioned on a protective circuit module, the connection member connecting the protective circuit module and the lead tab, the connection member including a flat plate portion opposite to the protective circuit module, and first support portions respectively extending from opposite lateral sides of the flat plate portion to the protective circuit module to support the plate portion and define a space portion into which the lead tab is inserted, wherein the lead tab directly contacts the top surface of the protection circuit module and is spaced apart from the bottom surface of the flat plate portion by a uniform distance such that the space portion is not entirely filled by the inserted lead tab, the flat plate portion having a first through-hole and the lead tab including a second through-hole, the second through-hole being located at a position corresponding to a location of the first through-hole such that the first through-hole and the second through-hole are aligned; and a soldering member inserted into the connection member through the first through-hole and filling the second through-hole so as to form a connection between the connection member and the lead tab, the soldering member being confined to the first though-hole, the second through-hole and the space portion.

2. The battery pack as claimed in claim 1, wherein the lead tab extends from a bare cell.

3. The battery pack as claimed in claim 1, wherein the soldering member fills the space portion.

4. The battery pack as claimed in claim 1, wherein a region of the protective circuit module where the lead tab is inserted includes a step.

5. The battery pack as claimed in claim 1, wherein the connection member further includes a second support portion extending from a side of the connection member opposite to the side of the connection member into which the lead tab is inserted, the second support portion further supporting the flat plate portion with respect to the protective circuit module.

6. The battery pack as claimed in claim 1, wherein the connection member further includes a guide portion extending from the side of the connection member into which the lead tab is inserted.

7. The battery pack as claimed in claim 1, wherein the second through-hole includes a plurality of second through-holes that collectively align with the first through-hole.

8. The battery pack as claimed in claim 1, wherein the lead tab includes a first region and a second region, the second region being positioned closer to the connection member than the first region, and the second region being narrower than the first region.

9. The battery pack as claimed in claim 1, wherein the lead tab includes a bent portion that blocks the space portion to prevent solder of the soldering member from moving to an outside of the connection member.

10. The battery pack as claimed in claim 1, wherein the lead tab includes a protruding portion that blocks the space portion to prevent solder of the soldering member from moving to an outside of the connection member.

11. The battery pack as claimed in claim 1, wherein the lead tab and the connection member are coupled by a hook structure.

12. A battery pack, comprising:

a lead tab;

a connection member positioned on a protective circuit module, the connection member connecting the protective circuit module and the lead tab, the connection member including a flat plate portion opposite to the protective circuit module, and first support portions respectively extending from lateral sides of the connection member to the protective circuit module to support the plate portion and define a space portion into which the lead tab is inserted, wherein the lead tab directly contacts the top surface of the protection circuit module and is spaced apart from the bottom surface of the flat plate portion by a uniform distance such that the space portion is not entirely filled by the inserted lead tab, the plate portion having a first through-hole; and a soldering member inserted into the connection member through the first through-hole so as to form a connection between the connection member and the lead tab, wherein the lead tab includes at least one prominence located at a position corresponding to a location of the first through hole, the at least one prominence increasing a coupling area of the soldering member and the lead tab, the soldering member being confined to the first though-hole, and the space portion.

* * * * *